(12) United States Patent
Qiu et al.

(10) Patent No.: US 7,184,709 B2
(45) Date of Patent: Feb. 27, 2007

(54) RADIO PACKET COMMUNICATION SYSTEM, RADIO PACKET COMMUNICATION METHOD, BASE STATION AND MOBILE STATION

(75) Inventors: Heng Qiu, Yokosuka (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 582 days.

(21) Appl. No.: 10/784,222

(22) Filed: Feb. 24, 2004

(65) Prior Publication Data

US 2004/0166900 A1 Aug. 26, 2004

(30) Foreign Application Priority Data

Feb. 25, 2003 (JP) ............................. 2003-048035

(51) Int. Cl.
  *H04B 1/00* (2006.01)
(52) U.S. Cl. .................. 455/63.1; 455/560; 455/524; 455/67.11
(58) Field of Classification Search ............... 455/504, 455/550.1, 428, 435.2, 452.2, 13.4, 522, 455/524, 525, 63.1, 67.11, 67.16, 445, 114.2
See application file for complete search history.

(56) References Cited

U.S. PATENT DOCUMENTS

| 2001/0016499 A1* | 8/2001 | Hamabe ..................... 455/454 |
| 2001/0020924 A1 | 9/2001 | Makino |
| 2002/0027413 A1 | 3/2002 | Kanazawa et al. |
| 2002/0050960 A1 | 5/2002 | Setoguchi et al. |
| 2003/0011307 A1 | 1/2003 | Otani et al. |
| 2003/0125067 A1* | 7/2003 | Takeda et al. ............... 455/522 |
| 2005/0002422 A1* | 1/2005 | Morihiro et al. ............ 370/477 |
| 2005/0075112 A1* | 4/2005 | Ball et al. ................ 455/456.1 |

FOREIGN PATENT DOCUMENTS

| JP | 9-129139 A | 5/1997 |
| JP | 11-297211 A | 10/1999 |
| JP | 2002-75213 A | 3/2002 |
| JP | 2002-140033 A | 5/2002 |
| JP | 2003-31130 A | 1/2003 |

* cited by examiner

*Primary Examiner*—Matthew D. Anderson
*Assistant Examiner*—Tan Trinh
(74) *Attorney, Agent, or Firm*—Oblon, Spivak, McClelland, Maier & Neustadt, P.C.

(57) ABSTRACT

A base station includes an adjacent cell interference amount calculator and an adjacent cell interference amount notifier. The adjacent cell interference amount calculator calculates an adjacent cell interference amount caused by an adjacent cell adjacent to an original cell managed by the base station. The adjacent cell interference amount notifier notifies the mobile station of the adjacent cell interference amount. A mobile station includes radio resource associators, a selector, a propagation loss calculator, and a radio resource assigner. The radio resource associators associate a radio resource with a propagation loss in the radio packet communication. The selector selects a radio resource associator in accordance with the adjacent cell interference amount. The propagation loss calculator calculates a propagation loss in the radio packet communication. The radio resource assigner assigns the radio resource associated with the calculated propagation loss to the radio packet communication, based on the selected radio resource associator.

7 Claims, 9 Drawing Sheets

FIG.4A

| PROPAGATION LOSS RANK | RADIO RESOURCE |
|---|---|
| A | a1 |
| B | b1 |
| C | c1 |

FIG.4B

| PROPAGATION LOSS RANK | RADIO RESOURCE |
|---|---|
| A | a2 |
| B | b2 |
| C | c2 |

FIG.4C

| PROPAGATION LOSS RANK | RADIO RESOURCE |
|---|---|
| A | a3 |
| B | b3 |
| C | c3 |

FIG.4D

| INTERFERENCE AMOUNT RANK | RADIO RESOURCES ASSIGNMENT TABLE |
|---|---|
| 1 | INITIAL TABLE |
| 2 | INTERMEDIATE TABLE |
| 3 | FINAL TABLE |

RADIO PACKET COMMUNICATION SYSTEM, RADIO PACKET COMMUNICATION METHOD, BASE STATION AND MOBILE STATION

CROSS REFERENCE TO RELATED APPLICATION

This application is based upon and claims the benefit of priority from the prior Japanese Patent Application No. P2003-048035, filed on Feb. 25, 2003; the entire contents of which are incorporated herein by reference.

BACKGROUND OF THE INVENTION

1. Field of the Invention

The present invention relates to a radio packet communication system and a radio packet communication method for performing radio packet communication between a base station and a mobile station. The present invention also relates to a base station and a mobile station which are used in the system and the method.

2. Description of the Related Art

Conventionally, a radio packet communication system has been known in which each of base and mobile stations estimates a condition of a propagation path in a transmission frequency toward itself by using a signal received by itself, and determines a transmission-modulation mode for each other.

Specifically, each of the base and mobile stations estimates a condition of a propagation path in a transmission frequency toward itself by use of a received signal included in a time slot in a transmission frame, and then determines the transmission-modulation mode which can transmit the largest quantity of information within a given transmission error rate under the estimated condition of the transmission path. Subsequently, each of the base and mobile stations transmits data including information indicating the determined transmission-modulation mode by use of a time slot in a subsequent transmission frame. Then, each of the base and mobile stations, which has received the transmitted data, transmits a subsequent transmission frame by the transmission-modulation mode included in the data.

In this radio packet communication system, the base station or the mobile station transmits the transmission frames with the maximum transmission power by use of the transmission-modulation mode which can transmit the largest quantity of information within the given transmission error rate under the estimated condition of each transmission path. Therefore, the base station or the mobile station can achieve the maximum communication speed. That is, even when the condition of the propagation path changes, the base station or the mobile station modifies the transmission-modulation mode, but does not modify the transmission power.

A basic concept of the radio packet communication system is to reduce the number of packets to be transmitted in the same time slot or the number of mobile stations transmitting packets in the same time slot, so as to enable each packet or each mobile station to use many radio resources instantaneously, to complete transmission as soon as possible, and to offer the used radio resources to a subsequent packet or a different mobile station.

Moreover, there has been conventionally known a technique of adaptively changing a digital modulation mode in a radio packet communication system using a CDMA method, in which each of base and mobile stations spreads and transmits a digitally-modulated modulation signal to each other, and in which a downlink transmission frequency is different from an uplink transmission frequency.

Specifically, each of the base and mobile stations detects a signal to interference power ratio (SIR) which is an interference amount in a received signal included in a transmission frame, then selects a digital modulation mode out of a plurality of digital modulation modes which can transmit the largest quantity of information within a given transmission error rate based on the detected interference amount, and then transmits data including information indicating the selected digital modulation mode to each other. In this way, the base station or the mobile station can change the digital modulation mode adaptively.

This radio packet communication system tracks a variation in the interference amount attributable to a traffic variation, phasing, or the like, by detecting the interference amount at the base station or the mobile station, and uses the digital modulation mode which can transmit the largest quantity of information in accordance with the interference at that moment. In this way, the radio packet communication system can use the frequency effectively.

However, in the above-described radio packet communication system, when many mobile stations are located close to a cell border, the interference amount with an adjacent cell fluctuates instantaneously and significantly because of an instantaneous increase in the traffic in the cell. Accordingly, there has been a problem in that the radio packet communication system has a risk of an increase in occurrence of a communication error in the adjacent cell.

Moreover, in the above-described radio packet communication system, even when the total traffic in the cell is unchanged, the interference amount with the adjacent cell fluctuates instantaneously and significantly because of a variation in distance between the base station and the mobile station. Accordingly, there has been a problem in that a possibility of occurrence of a communication error in the adjacent cell increases.

BRIEF SUMMARY OF THE INVENTION

In view of the foregoing, it is an object of the present invention to provide a radio packet communication system, a radio packet communication method which effectuates stable radio packet communication by moderating an influence of a variation in an interference amount with an adjacent cell, and a base station and a mobile station which are suitable for use in the foregoing system and method.

A first aspect of the present invention is summarized as a radio packet communication system for performing radio packet communication between a base station and a mobile station. The base station includes an adjacent cell interference amount calculator and an adjacent cell interference amount notifier. The adjacent cell interference amount calculator is configured to calculate an adjacent cell interference amount caused by an adjacent cell which is adjacent to an original cell managed by the base station. The adjacent cell interference amount notifier is configured to notify the mobile station of the adjacent cell interference amount. The mobile station includes a plurality of radio resource associators, a selector, a propagation loss calculator, and a radio resource assigner. The radio resource associators are configured to associate a radio resource with a propagation loss in the radio packet communication. The selector is configured to select a radio resource associator in accordance with the adjacent cell interference amount notified by the base station. The propagation loss calculator is configured to calculate a propagation loss in the radio packet communication. The radio resource assigner is configured to assign the radio resource associated with the calculated propagation loss to the radio packet communication, in accordance with the selected radio resource associator.

A second aspect of the present invention is summarized as a radio packet communication method for performing radio packet communication between a base station and a mobile station. The mobile station has a plurality of radio resource associators configured to associate a radio resource with apropagation loss in the radio packet communication. The base station calculates an adjacent interference amount caused by an adjacent cell which is adjacent to an original cell managed by the base station. The base station notifies the mobile station of the adjacent cell interference amount. The mobile station selects a radio resource associator in accordance with the adjacent cell interference amount notified by the base station. The mobile station calculates a propagation loss in the radio packet communication. The mobile station assigns the radio resource associated with the calculated propagation loss to the radio packet communication, in accordance with the selected radio resource associator.

A third aspect of the present invention is summarized as a base station for performing radio packet communication with a mobile station. The base station includes a plurality of radio resource associators, an adjacent cell interference amount calculator, a selector, a propagation loss calculator, and a radio resource assigner. The radio resource associators are configured to associate a radio resource with a propagation loss in the radio packet communication. The adjacent cell interference amount calculator is configured to calculate an adjacent cell interference amount caused by an adjacent cell which is adjacent to an original cell managed by the base station. The selector is configured to select a radio resource associator in accordance with the adjacent cell interference amount. The propagation loss calculator is configured to calculate a propagation loss in the radio packet communication. The radio resource assigner is configured to assign the radio resource associated with the calculated propagation loss to the radio packet communication, in accordance with the selected radio resource associator.

A fourth aspect of the present invention is summarized as a base station for performing radio packet communication with a mobile station. The base station includes an adjacent cell interference amount calculator and an adjacent cell interference amount notifier. The adjacent cell interference amount calculator is configured to calculate an adjacent cell interference amount caused by an adjacent cell which is adjacent to an original cell managed by the base station. The adjacent cell interference amount notifier is configured to notify the mobile station of the adjacent cell interference amount.

A fifth aspect of the present invention is summarized as a mobile station for performing radio packet communication with a base station. The mobile station includes a plurality of radio resource associators, a selector, a propagation loss calculator, and a radio resource assigner. The radio resource associators are configured to associate a radio resource with a propagation loss in the radio packet communication. The selector is configured to select a radio resource associator in accordance with an adjacent cell interference amount notified by the base station. The adjacent cell interference amount are caused by an adjacent cell which is adjacent to an original cell managed by the base station. The propagation loss calculator is configured to calculate a propagation loss in the radio packet communication. The radio resource assigner is configured to assign the radio resource associated with the calculated propagation loss to the radio packet communication, in accordance with the selected radio resource associator.

BRIEF DESCRIPTION OF THE SEVERAL VIEWS OF THE DRAWINGS

FIGS. 4A to 4D show examples of tables to be managed by the base station in the radio packet communication system according to the first embodiment of the present invention.

DETAILED DESCRIPTION OF THE INVENTION (Configuration of a Radio Packet Communication System According to a First Embodiment of the Present Invention)

A configuration of a radio packet communication system according to a first embodiment of the present invention will be described with reference to FIG. 1 to FIG. 5.

Figure 1:
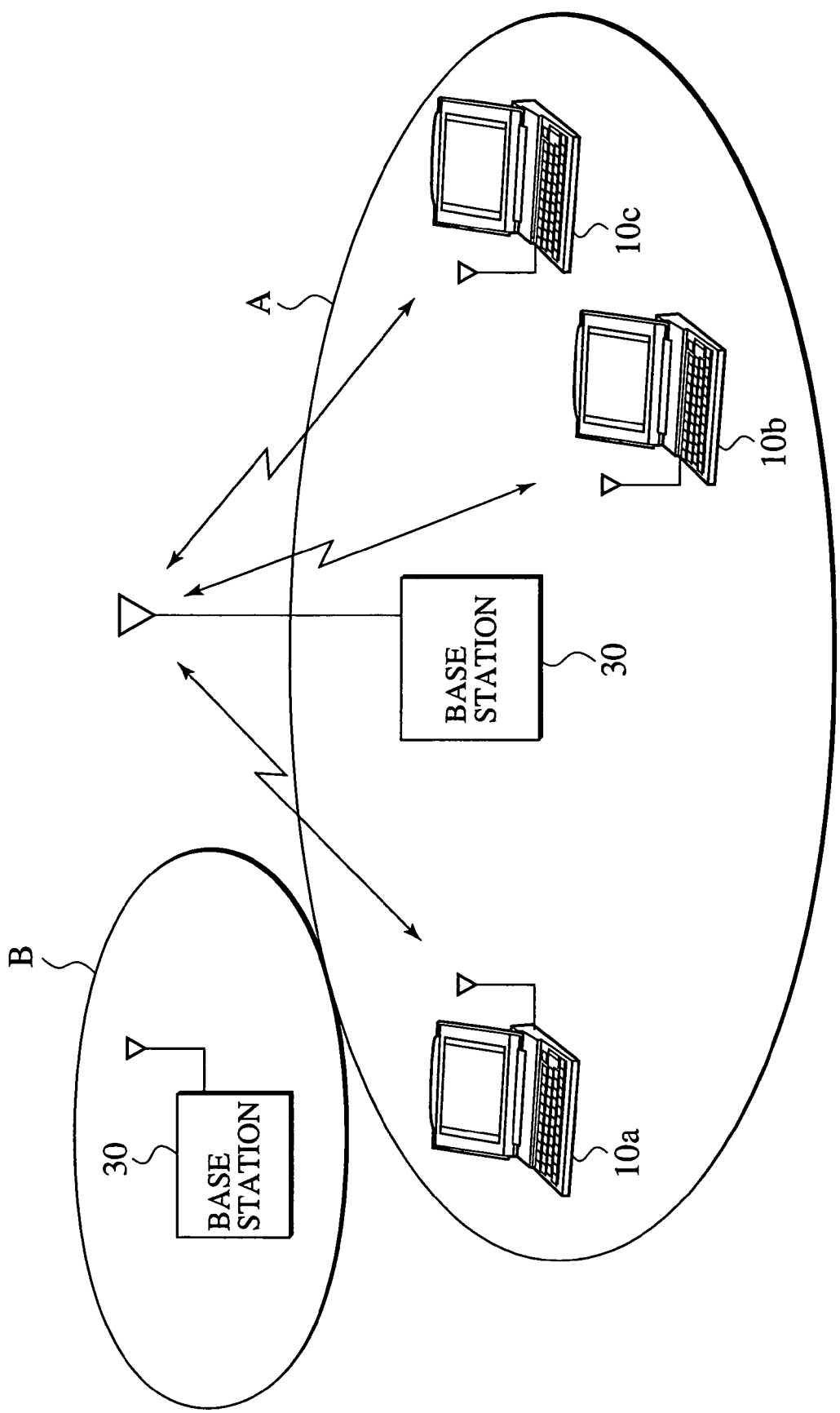
FIG. 1 is an overall block diagram of a radio packet communication system according to a first embodiment of the present invention.

As shown in FIG. 1, a radio packet communication system of this embodiment is configured to perform radio packet communication of the CDMA method between a base station 30 and a plurality of mobile stations 10a to 10c. As shown in FIG. 1, in this embodiment, packet signals from the plurality of mobile stations 10a to 10c located in a cell (a radio zone) A formed by the base station 30 are transmitted to the base station 30 on a common uplink radio channel.

Functions of the mobile station 10 in the radio packet communication system according to this embodiment will be described with reference to FIG. 2.

Figure 2:
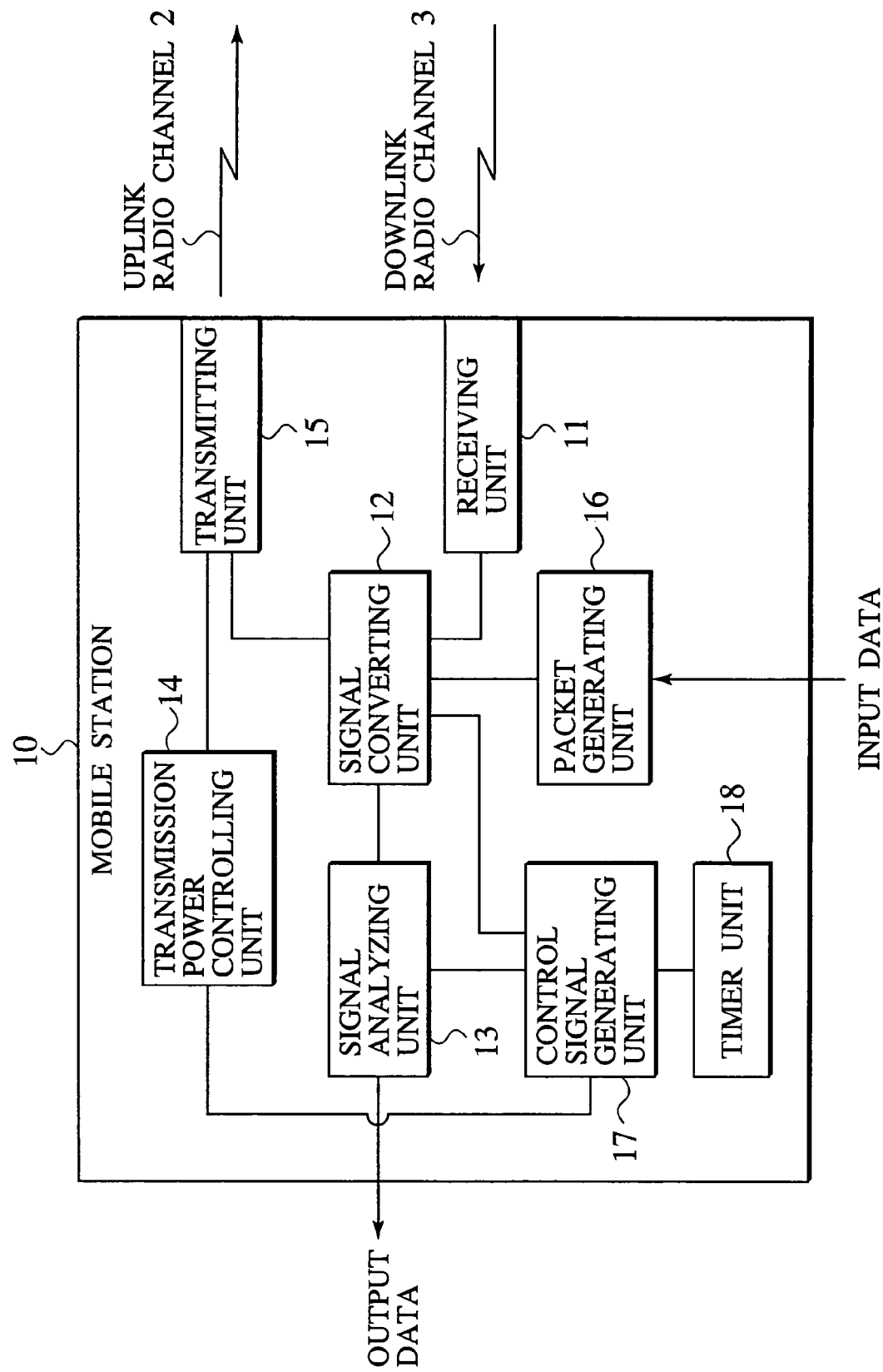
FIG. 2 is a functional block diagram of a mobile station in the radio packet communication system according to the first embodiment of the present invention.

As shown in FIG. 2, the mobile station 10 includes a receiving unit 11, a signal converting unit 12, a signal analyzing unit 13, a transmission power controlling unit 14, a transmitting unit 15, a packet generating unit 16, a control signal generating unit 17, and a timer unit 18.

The receiving unit 11 is a circuit configured to receive control signals and packet signals transmitted from the base station 30 through a downlink radio channel 3. The control signals include an assignment signal, a synchronization signal, a confirmation signal, and a pilot signal, for example. The receiving unit 11 transmits the received control signal to the signal converting unit 12.

The signal converting unit 12 is a circuit configured to perform given signal conversion. Specifically, the signal converting unit 12 subjects a packet from the packet generating unit 16, or a control signal from the control signal generating unit 17 such as a reservation signal or a pilot signal, to an encoding process, a spreading process, and a modulating process, and then outputs the packet or the control signal to the transmitting unit 15.

Meanwhile, the signal converting unit 12 subjects a control signal from the receiving unit 11 such as an assignment signal, or a packet signal, to a demodulating process, a despreading process, and a decoding process, and then outputs the control signal or the packet signal to the signal analyzing unit 13.

Moreover, the signal converting unit 12 may be configured to subject the packet from the packet generating unit 16 to the spreading process and the modulating process by use of a spreading code and a modulation mode which are notified by an enabling signal from the signal analyzing unit 13, and to output the packet signal subjected to the spreading process and the modulating process to the transmitting unit 15 based on timing information which is notified by the enabling signal.

The signal analyzing unit 13 is a circuit configured to analyze the control signal and the packet signal from the signal converting unit 12, and to output an analysis result to the respective units in response to the type of the signal.

For example, the signal analyzing unit 13 analyzes the assignment signal from the base station 30, and thereby outputs the spreading code, the timing information, and the like, which are assigned to the packet signal transmitted from the base station 30, to the signal converting unit 12.

Meanwhile, the signal analyzing unit 13 analyzes the control signal from the base station 30, and thereby outputs information concerning the transmission power, which is assigned to the packet signal transmitted from the base station 30, to the transmission power controlling unit 14.

Moreover, the signal analyzing unit 13 analyzes the synchronization signal or the pilot signal from the base station 30, and thereby outputs synchronization information to the control signal generating unit 17.

Furthermore, the signal analyzing unit 13 analyzes the packet signal from the base station 30, and thereby outputs output data.

The transmission power controlling unit 14 is a circuit configured to control the transmission power of a signal to be transmitted through the transmitting unit 15.

The transmission power controlling unit 14 outputs information concerning the transmission power of the reservation signal and information concerning the maximum transmission power of the mobile station 10, to the control signal generating unit 17.

The transmitting unit 15 is a circuit configured to transmit the control signal such as the reservation signal or the pilot signal, and the packet signal which have been converted by the signal converting unit 12, to the base station 30 with the transmission power controlled by the transmission power controlling unit 14 through an uplink radio channel 2.

The packet generating unit 16 is a circuit configured to generate packets based on input data. Specifically, the packet generating unit 16 generates a plurality of packets by dividing input data having at least a given length. The packet generating unit 16 outputs the generated packets to the signal converting unit 12.

The control signal generating unit 17 is a circuit configured to generate various control signals such as the reservation signal, the synchronization signal or the pilot signal. The control signal generating unit 17 outputs the control signals thus generated to the signal converting unit 12.

Moreover, the control signal generating unit 17 can generate the reservation signal which includes the information concerning the transmission power of the reservation signal and the information concerning the maximum transmission power of the mobile station 10 from the transmission power controlling unit 14, and the like.

Meanwhile, the control signal generating unit 17 may be configured to generate the control signals such as the synchronization signal or the reservation signal periodically in response to an instruction from the timer unit 18.

Moreover, the control signal generating unit 17 can generate the reservation signal for acquiring the spreading code, the modulation mode, the transmission power, the timing information, and the like, from the base station 30 prior to transmission of the packet signal.

Furthermore, the control signal generating unit 17 can generate the reservation signal which includes information concerning an amount (or the number) of subsequent packets and the current transmission power.

Functions of the base station 30 in the radio packet communication system according to this embodiment will be described with reference to FIG. 3.

Figure 3:
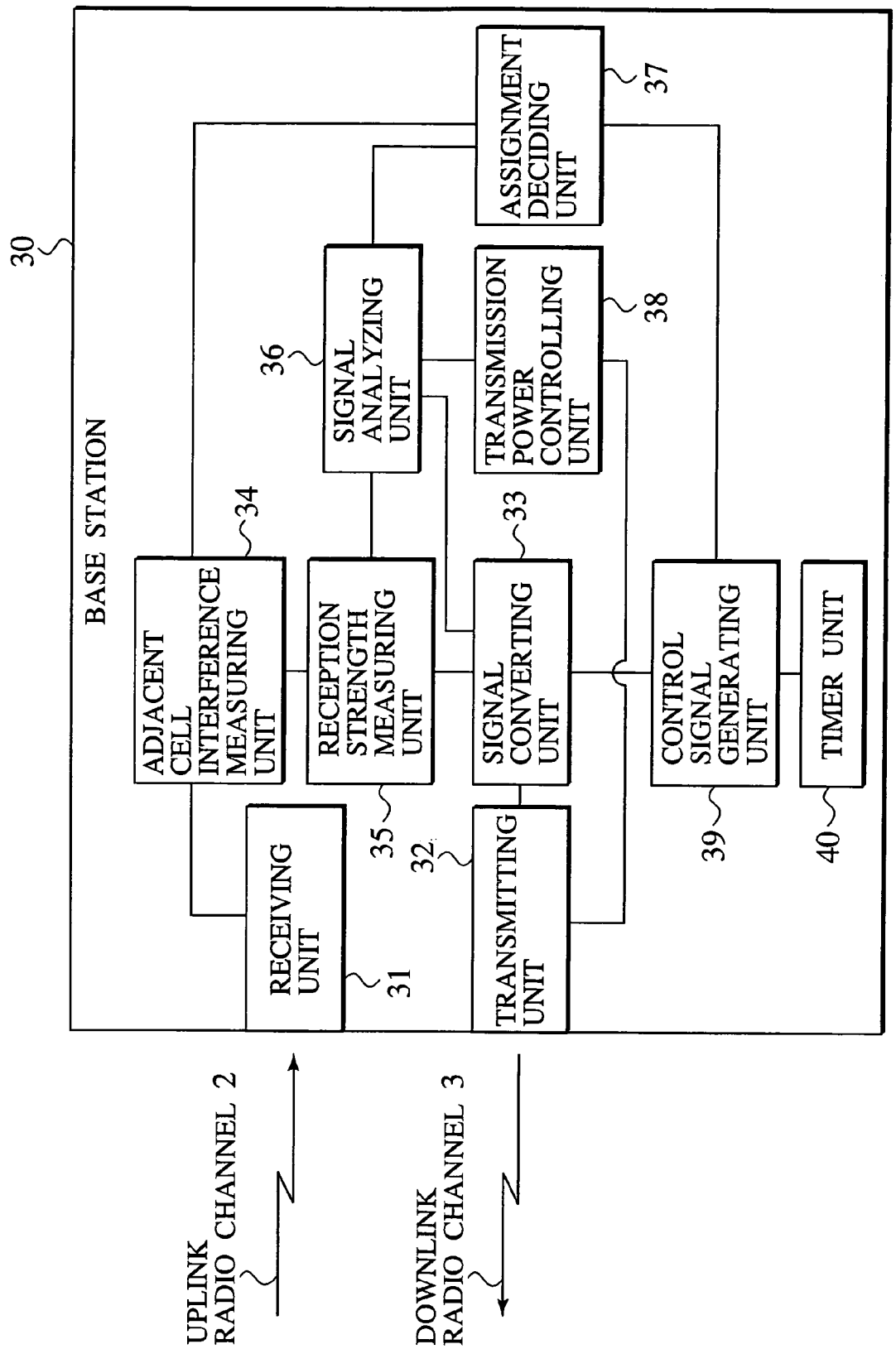
FIG. 3 is a functional block diagram of a base station in the radio packet communication system according to the first embodiment of the present invention.

As shown in FIG. 3, the base station 30 includes a receiving unit 31, a transmitting unit 32, a signal converting unit 33, an adjacent cell interference measuring unit 34, a reception strength measuring unit 35, a signal analyzing unit 36, an assignment deciding unit 37, a transmission power controlling unit 38, a control signal generating unit 39, and a timer unit 40.

The receiving unit 31 is a circuit configured to receive the control signals such as the reservation signal or the pilot signal, and the packet signals, through the uplink radio channel 2.

The receiving unit 31 outputs the received signals to the signal converting unit 33 through the adjacent cell interference measuring unit 34 and the reception strength measuring unit 35.

The transmitting unit 32 is a circuit configured to transmit the control signal such as the assignment signal, the synchronization signal, the confirmation signal or the pilot signal, and the packet signal, through the downlink radio channel 3.

The transmitting unit 32 transmits the control signal and the packet signal from the signal converting unit 33 with the transmission power controlled by the transmission power controlling unit 38.

The signal converting unit 33 is a circuit configured to perform given signal conversion. The signal converting unit 33 subjects a control signal from the control signal generating unit 39 to the encoding process, the spreading process, and the modulating process, and then outputs the control signal to the transmitting unit 32.

Meanwhile, the signal converting unit 33 subjects a control signal such as the assignment signal or the packet signal from the reception strength measuring unit 35, to the demodulating process, the despreading process, and the decoding process, and then outputs the control signal or the packet signal to the signal analyzing unit 36.

In this embodiment, the adjacent cell interference measuring unit 34 constitutes an adjacent cell interference amount calculator configured to calculate an adjacent cell interference amount caused by an adjacent cell B, which is adjacent to the original cell A to be managed by the base station 30.

The adjacent cell interference measuring unit 34 can calculate a total interference amount based on the signal transmitted from the mobile station 10, and calculate an original cell interference amount in the original cell A based on the received amount of packets (the received packet amount), and thereby calculate the adjacent cell interference amount caused by the adjacent cell B by use of the total interference amount and the original cell interference amount.

For example, the adjacent cell interference measuring unit 34 can detect the total interference amount, based on SIR and desired signal received power of the pilot signal transmitted from the mobile station 10. The adjacent cell interference measuring unit 34 can estimate the original cell interference amount in the original cell A based on the received amount of packets. Therefore, the adjacent cell interference measuring unit 34 can determine the remaining interference amount obtained by subtracting the original cell interference amount from the total interference amount, as the adjacent cell interference amount.

The adjacent cell interference measuring unit 34 outputs the calculated adjacent cell interference amount to the assignment deciding unit 37. Here, the adjacent cell interference measuring unit 34 may be configured to average the calculated adjacent cell interference amount in a given period, and to output information concerning the averaged adjacent cell interference amount to the assignment deciding unit 37.

The reception strength measuring unit 35 is a circuit configured to measure reception strength of the reservation signal from the adjacent cell interference measuring unit 34, and to output a measurement result to the signal analyzing unit 36.

The signal analyzing unit 36 is a circuit configured to analyze the control signals from the signal converting unit 33. The signal analyzing unit 36 mainly analyzes the reservation signal or the synchronization signal, and outputs an analysis result to the assignment deciding unit 37 and the transmission power controlling unit 38.

For example, the signal analyzing unit 36 may be configured to analyzes the reservation signal, and thereby to extract the information concerning the amount of packets and the current transmission power, the information concerning the maximum transmission power of the mobile station 10, or the like, and to output the information to the assignment deciding unit 37.

Moreover, in this embodiment, the signal analyzing unit 36 constitutes a propagation loss calculator configured to calculate a propagation loss in the radio packet communication with the mobile station 10, based on the information concerning the current transmission power included in the reservation signal and based on the reception strength of the reservation signal from the reception strength measuring unit 35.

The signal analyzing unit 36 outputs the information concerning the calculated propagation loss to the assignment deciding unit 37 and the transmission power controlling unit 38.

The assignment deciding unit 37 includes a plurality of radio resources assignment tables (radio resource associators) configured to associate the radio resources with the propagation loss in the radio packet communication the mobile station 10.

FIGS. 4A to 4C show examples of the radio resources assignment tables for the original cell A. As shown in FIGS. 4A to 4C, the radio resources assignment tables are configured to associate "propagation loss ranks" with the "radio resources".

Here, the "propagation loss rank" is defined by the propagation loss between the mobile station 10 and the base station 30 in the original cell A.

Figure 5:
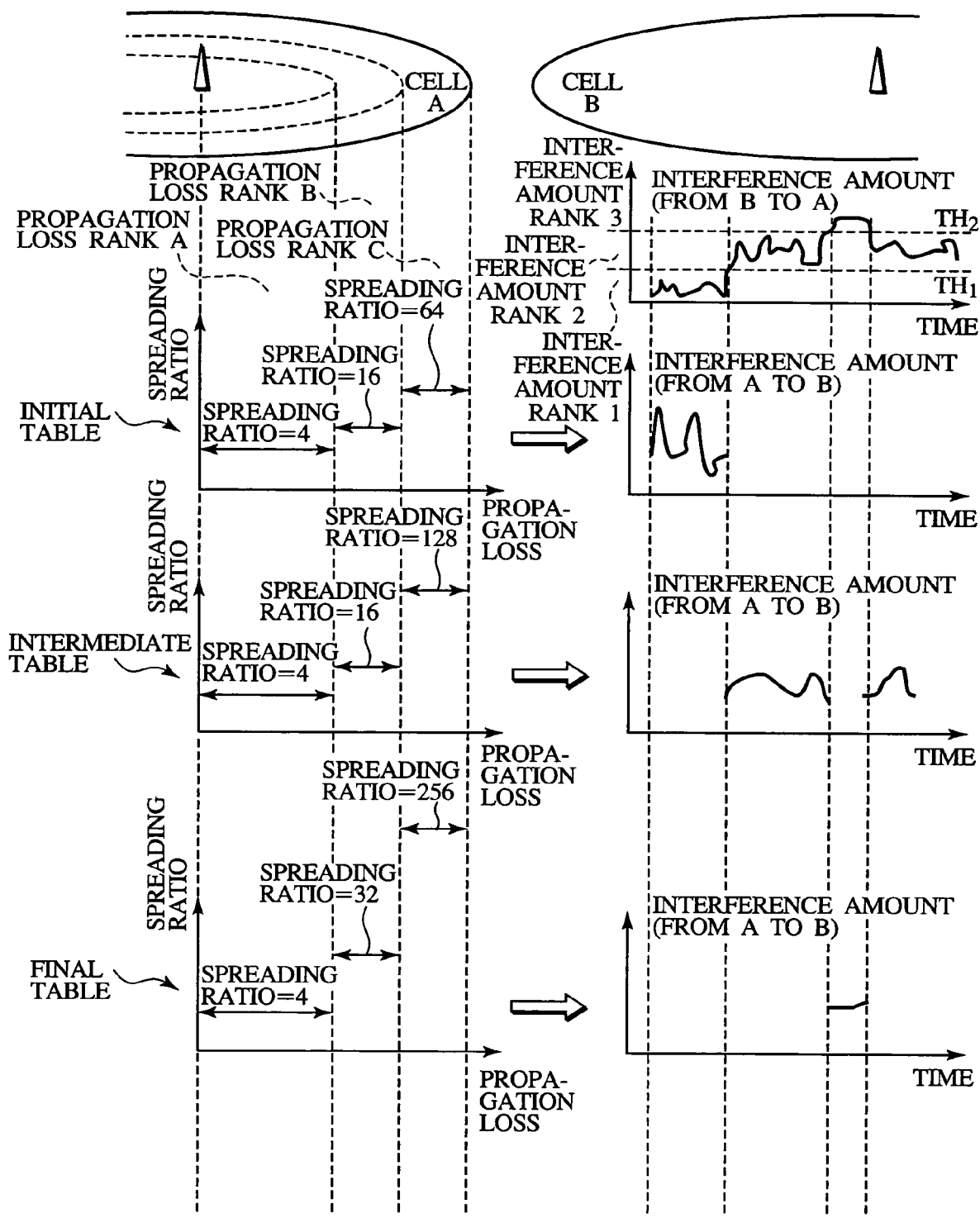
FIG. 5 is a view for explaining an operation to allocate radio resources by the base station in the radio packet communication system according to the first embodiment of the present invention.

For example, in this embodiment, as shown in FIG. 5, the propagation loss rank assigned to the area having the smallest propagation loss, i.e. the area having the shortest distance from the base station 30 is defined as "A". The propagation loss rank assigned to the area having the second smallest propagation loss, i.e. the area having the second shortest distance from the base station 30 is defined as "B". The propagation loss rank assigned to the area having the largest propagation loss, i.e. the area having the longest distance from the base station 30 is defined as "C".

Meanwhile, the "radio resources" indicate radio resources to be assigned to the respective mobile stations located in the areas corresponding to the above-described propagation loss ranks A to C.

For example, the "radio resources" indicates at least one of spreading ratio, the number of spreading codes, the modulation mode, a coding rate of an error correction code, and the transmission power.

An initial table shown in FIG. 4A is set as follows.

First, upper limits of transmission rates to be assigned to the respective areas corresponding to the propagation loss ranks A to C are determined based on the maximum transmission power of the mobile station 10 and the highest propagation losses in the respective areas corresponding to the propagation loss ranks A to C.

Second, to achieve the transmission rates, radio resources a1 to c1 to be associated with the respective propagation loss ranks A to C are determined.

Meanwhile, a final table shown in FIG. 4C is set as follows.

First, in the radio packet communication system, the minimum transmission rates to be guaranteed by the respective areas corresponding to the propagation loss ranks A to C are determined.

Second, to achieve the transmission rates, radio resources a3 to c3 to be associated with the respective propagation loss ranks A to C are determined.

Moreover, an intermediate table shown in FIG. 4B is set as follows.

First, transmission rates between the above-described upper limits of the transmission rates and the above-described minimum transmission rates are determined for the respective areas corresponding to the propagation loss ranks A to C.

Second, to achieve the transmission rates, radio resources a2 to c2 to be associated with the respective propagation loss ranks A to C are determined.

In an example shown in FIG. 5, regarding the initial table, the spreading ratio set as "4" is associated with the propagation loss rank A, the spreading ratio set as "16" is associated with the propagation loss rank B, and the spreading ratio set as "64" is associated with the propagation loss rank C.

Meanwhile, regarding the intermediate table, the spreading ratio set as "4" is associated with the propagation loss rank A, the spreading ratio set as "16" is associated with the propagation loss rank B, and the spreading ratio set as "128" is associated with the propagation loss rank C.

Moreover, regarding the final table, the spreading ratio set as "4" is associated with the propagation loss rank A, the spreading ratio set as "32" is associated with the propagation loss rank B, and the spreading ratio set as "256" is associated with the propagation loss rank C.

That is, in this embodiment, regarding the respective radio resources assignment tables, the transmission rate of the mobile station 10 in the propagation loss rank B is set slightly higher than the transmission rate of the mobile station 10 in the propagation loss rank C.

Moreover, regarding the respective radio resources assignment tables, the transmission rate of the mobile station 10 in the propagation loss rank A is set equal.

Note that the transmission rate is in inverse proportion to the spreading ratio herein.

Meanwhile, the assignment deciding unit 37 constitutes a selector configured to select a radio resources assignment table (a radio resource associator) in response to the adjacent cell interference amount which is transmitted from the adjacent cell interference measuring unit 34.

Specifically, the assignment deciding unit 37 makes reference to a selection table shown in FIG. 4D, and selects the specific radio resources assignment table in response to the adjacent cell interference amount.

FIG. 4D shows an example of the selection table for the original cell A. As shown in FIG. 4D, the selection table is configured to associate "interference amount rank" with "radio resources assignment tables".

Here, the "interference amount rank" is defined by the interference amount caused by the adjacent cell B.

In this embodiment, when there is a small interference amount caused by the adjacent cell B as shown in FIG. 5, for example, when the interference amount caused by the adjacent cell B is below a threshold TH1, the interference amount rank is defined as "1".

When there is a large interference amount caused by the adjacent cell B, for example, when the interference amount caused by the adjacent cell B is not less than the threshold TH1 but less than a threshold TH2, the interference amount rank is defined as "2".

When there is an extremely large interference amount caused by the adjacent cell B, for example, the interference amount caused by the adjacent cell B is not less than the threshold TH2, the interference amount rank is defined as "3".

Meanwhile, the "radio resources assignment table" indicates a radio resources assignment table to be selected by the assignment deciding unit 37 in the case of corresponding to the above-described interference amount ranks "1" to "3" respectively.

The selection table is configured such that the initial table for setting the fastest transmission rate is selected when the interference amount caused by the adjacent cell B is small (in the case of the interference amount rank "1").

The selection table is configured such that the intermediate table is selected when the interference amount caused by the adjacent cell B is large (in the case of the interference amount rank "2").

The selection table is configured such that the final table for setting the slowest transmission rate is selected when the interference amount caused by the adjacent cell B is extremely large (in the case of the interference amount rank "3").

According to settings of the above-described radio resources assignment tables and the selection table, as shown in FIG. 5, the radio resources are assigned to a mobile station located in the vicinity of the cell border (the mobile station in the propagation loss rank C) so as to slow down transmission rate thereof when the interference amount caused by the adjacent cell B is large (i.e. when a traffic amount of the adjacent cell B is large). Therefore, it is possible to stabilize or reduce the interference amount from the original cell A to the adjacent cell B.

In this case, it is possible to slow down the transmission rate of the mobile station located in the vicinity of the cell border, by means of increasing the spreading ratio to be assigned to the mobile station located in the vicinity of the cell border, reducing the number of spreading code to be assigned to the mobile station located in the vicinity of the cell border, selecting the modulation mode with a slower speed to be assigned to the mobile station located in the vicinity of the cell border, reducing the efficiency of the coding rate to be assigned to the mobile station located in the vicinity of the cell border, and the like.

Moreover, in this case, it is also effective to suppress the transmission power to be assigned to the mobile station located in the vicinity of the cell border.

That is, according to the above-described table settings, the mobile station located in the vicinity of the cell border (the mobile station in the propagation loss rank C) is changed from high-speed intermittent transmission to continuous low-speed transmission. Therefore, the interference amount with the adjacent cell B (the interference amount from the original cell A to the adjacent cell B) is averaged.

Moreover, according to the above-described table settings, a variation in the interference amount with the adjacent cell B is moderated by a statistical multiplexing effect attributable to an increase in the number of mobile stations which are simultaneously transmittable.

Furthermore, according to the above-described table settings, the transmission rate of the mobile station located in the vicinity of the cell border (the mobile station in the propagation loss rank C) is reduced. Therefore, the interference amount with the adjacent cell B is reduced.

As a result, it is possible to increase trackability relative to the variation in the interference amount caused by the adjacent cell B, when a transmission power controlling process, an adaptive modulating process or an encoding process is performed on an SIR basis. Accordingly, it is possible to increase system throughput, and to improve communication quality by reducing an interference margin.

Meanwhile, when the interference amount caused by the adjacent cell B is increased, it is possible to reduce the interference amount with the adjacent cell B and to achieve effective use of the radio resources in a multi-cell environment, by assigning the radio resources (such as the spreading ratio) to the mobile station located in the vicinity of the cell border so as to slow down the transmission rate thereof, and by reducing the transmission power at the same time. In this way, it is possible to increase the system throughput, and to improve the communication quality.

In the meantime, the reason for assigning the radio resources (such as the spreading ratio) to the mobile station so as to slow down the transmission rate as described above, only when the interference amount caused by the adjacent cell B is large (i.e. when the traffic amount of the adjacent cell B is large) is as follows.

When the interference amount caused by the adjacent cell B is small (i.e. when the traffic amount of the adjacent cell B is small), the adjacent call B can perform transmission with a large interference margin, and it is less likely to cause a failure to receive information bits. Accordingly, a desire to exert the maximum communication speed of the mobile station in the original cell A has a priority.

On the contrary, when the interference amount caused by the adjacent cell B is large (i.e. when the traffic amount of the adjacent cell B is large), the interference amount caused by the original cell A, which is estimated by the adjacent cell B, is smaller than the real amount. Therefore, there is an increasing risk of occurrence of a failure to receive a large amount of information bits at the adjacent cell B. Hence, it is significant to stabilize the interference amount from the cell A to the cell B, so as to accurately estimate the interference amount caused by the cell A in the adjacent cell B.

In addition, the reason for modifying only the transmission rate of the mobile station located in the vicinity of the cell border (i.e. the mobile station in the propagation loss rank C) is as follows.

Simultaneous transmission among fewer mobile stations (less than 8 stations, for example) has a smaller ratio between interfered reception power and total reception power, as compared to simultaneous transmission among more mobile stations (8 stations or more, for example). Accordingly, the simultaneous transmission among fewer mobile stations can achieve higher system throughput.

For this reason, in order to maintain the high system throughput, the transmission rate of the mobile station located in a central part of the cell (i.e. the mobile station in the propagation loss rank A), which can use the entire radio resources with fewer mobile stations, is retained high without change.

On the contrary, an effect to the system throughput is limited even if the number of mobile stations for performing the simultaneous transmission is increased, by reducing the transmission rate of the mobile station located in the vicinity of the cell border (i.e. the mobile station in the propagation loss rank C) which cannot use the entire radio resources in the absence of the large number of mobile stations due to the propagation losses and the like. Accordingly, only the transmission rate of the mobile station located in the vicinity of the cell border is modified.

Moreover, since the interference amount with the adjacent cell B caused by the mobile station located in the vicinity of the cell border is larger than the interference amount with the adjacent cell B caused by the mobile station located in the central part of the cell, it is effective to stabilize or reduce the interference amount with the adjacent cell B caused by the mobile station located in the vicinity of the cell border.

Meanwhile, the assignment deciding unit 37 constitutes a radio resources assigner configured to make reference to the selected radio resources assignment table, and thereby to assign the radio resources associated with the calculated propagation loss, to the radio packet communication with the mobile station 10.

Moreover, the assignment deciding unit 37 can update the radio resources assignment table in response to the adjacent cell interference amount within a given period (such as an average interference amount caused by the adjacent cell), which is transmitted from the adjacent cell interference measuring unit 34.

Furthermore, the assignment deciding unit 37 transmits a result of assignment of the radio resources to the control signal generating unit 39.

The transmission power controlling unit 38 determines the transmission power based on the information concerning the propagation loss from the signal analyzing unit 36, and outputs the transmission power to the transmitting unit 32.

The control signal generating unit 39 generates an assignment signal, and outputs the assignment signal to the signal converting unit 33. The assignment signal is transmitted from the assignment deciding unit 37, and notifies the mobile station 10 of the result of assignment of the radio resources.

Alternatively, the control signal generating unit 39 may be configured to generate the control signals such as the assignment signal, the synchronization signal, the confirmation signal or the pilot signal periodically in response to an instruction from the timer unit 40.

(Actions of the Radio Packet Communication System According to this Embodiment)

Actions of the radio packet communication according to this embodiment will be described with reference to FIG. 6.

Figure 6:
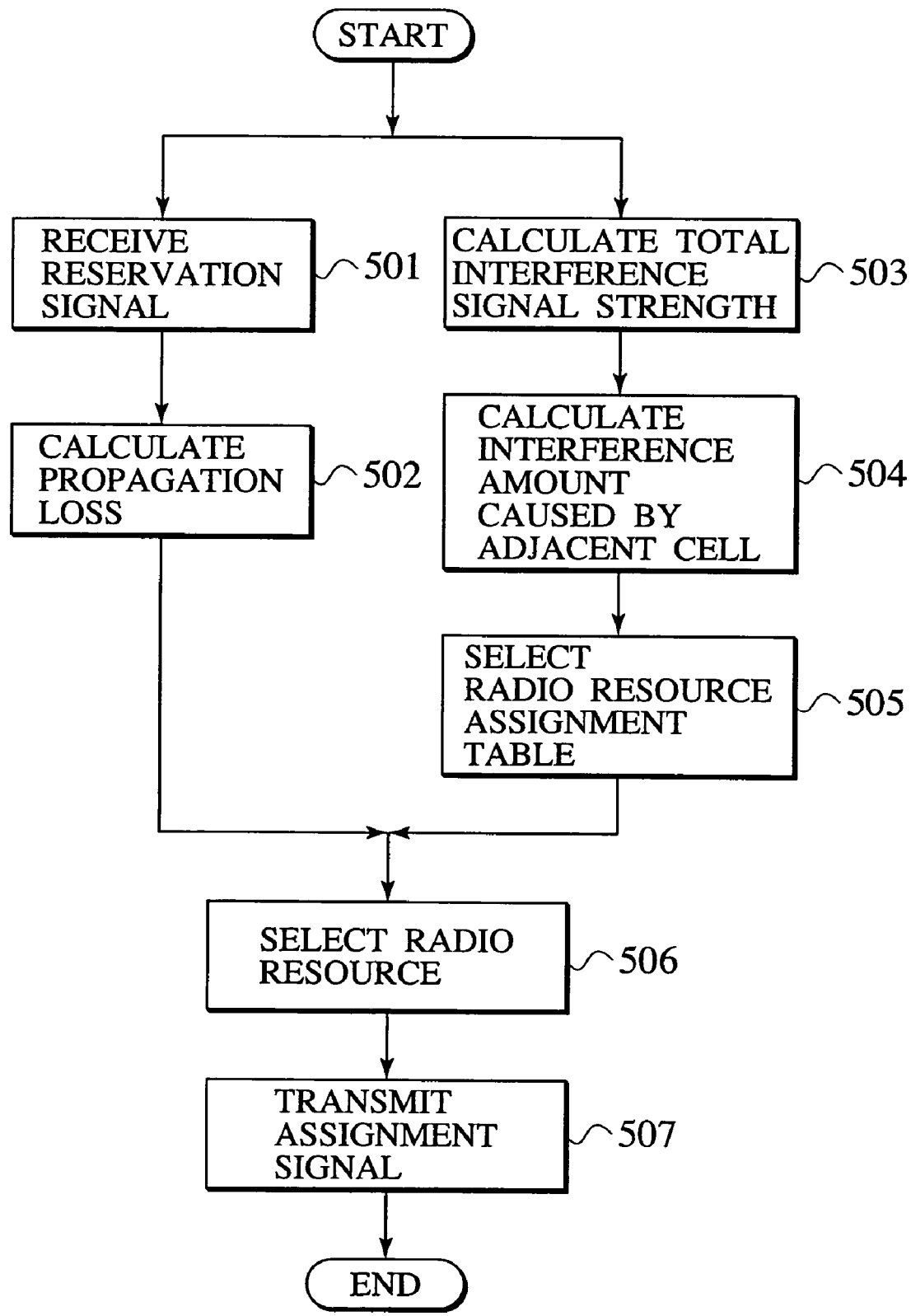
FIG. 6 is a flowchart showing the operation to allocate the radio resources by the base station in the radio packet communication system according to the first embodiment of the present invention.

As shown in FIG. 6, in Step 501, the reception strength measuring unit 35 of the base station 30 receives the reservation signal transmitted from the mobile station 10, prior to transmission of the packet signal, and measures the reception power (the reception strength) of the reservation signal.

In Step 502, the signal analyzing unit 36 of the base station 30 calculates the propagation loss in the radio packet communication with the mobile station 10, based on the information concerning the current transmission power included in the reservation signal, and based on the reception strength of the reservation signal from the reception strength measuring unit 35.

In Step 503, the adjacent cell interference measuring unit 34 calculates the total interference amount (total interference signal strength) based on the signal transmitted from the mobile station 10.

In Step 504, the adjacent cell interference measuring unit 34 calculates the interference amount caused by the adjacent cell B, based on the calculated total interference amount (the total interference signal strength) and the interference amount in the original cell A calculated by the received amount of packets.

In Step 505, the assignment deciding unit 37 makes reference to the selection table shown in FIG. 4D, and selects the specific radio resources assignment table in response to the interference amount caused by the adjacent cell B.

Here, the radio resources assignment table is updated in response to the interference amount caused by the adjacent cell B within a given period (such as several tens of seconds or several minutes).

Meanwhile, the interference amount caused by the adjacent cell B within the given period is calculated by adding the interference amount caused by the adjacent cell B in each time slot.

In Step 506, the assignment deciding unit 37 makes reference to the selected radio resources assignment table, and assigns the radio resources associated with the propagation loss calculated by the adjacent cell interference measuring unit 34, to the radio packet communication with the mobile station 10.

In Step 507, the control signal generating unit 39 generates the assignment signal for notifying the mobile station 10 of the radio resources assigned by the assignment deciding unit 37, and transmits the assignment signal to the mobile station 10 through the signal converting unit 33 and the transmitting unit 32.

(Operation and Effect of the Radio Packet Communication System According to this Embodiment)

According to the radio packet communication system of this embodiment, the assignment deciding unit 37 of the base station 30 assigns the radio resources in response to the interference amount caused by the adjacent cell B. Therefore, it is possible to adjust the radio resources to be assigned to the mobile station 10 having the large interference amount with the adjacent cell (such as the mobile station located in the vicinity of the cell border) and the radio resources to be assigned to the mobile station 10 having the small interference amount with the adjacent cell (such as the mobile station located in the central part of the cell). In this way, it is possible to reduce an influence of the variation in the interference amount with the adjacent cell B without reducing the transmission rate of the mobile station located in the central part of the cell.

(Configuration of a Radio Packet Communication System According to a Second Embodiment of the Present Invention)

A configuration of a radio packet communication system according to a second embodiment of the present invention will be described with reference to FIG. 7 and FIG. 8.

Whereas the radio packet communication system according the above-described first embodiment is an example of a reservation-type system in which the base station 30 assignes the radio resources to the mobile station 10, the radio packet communication system according to this embodiment is a non-reservation-type system in which the mobile station 10 assigns the radio resources by itself.

Figure 7:
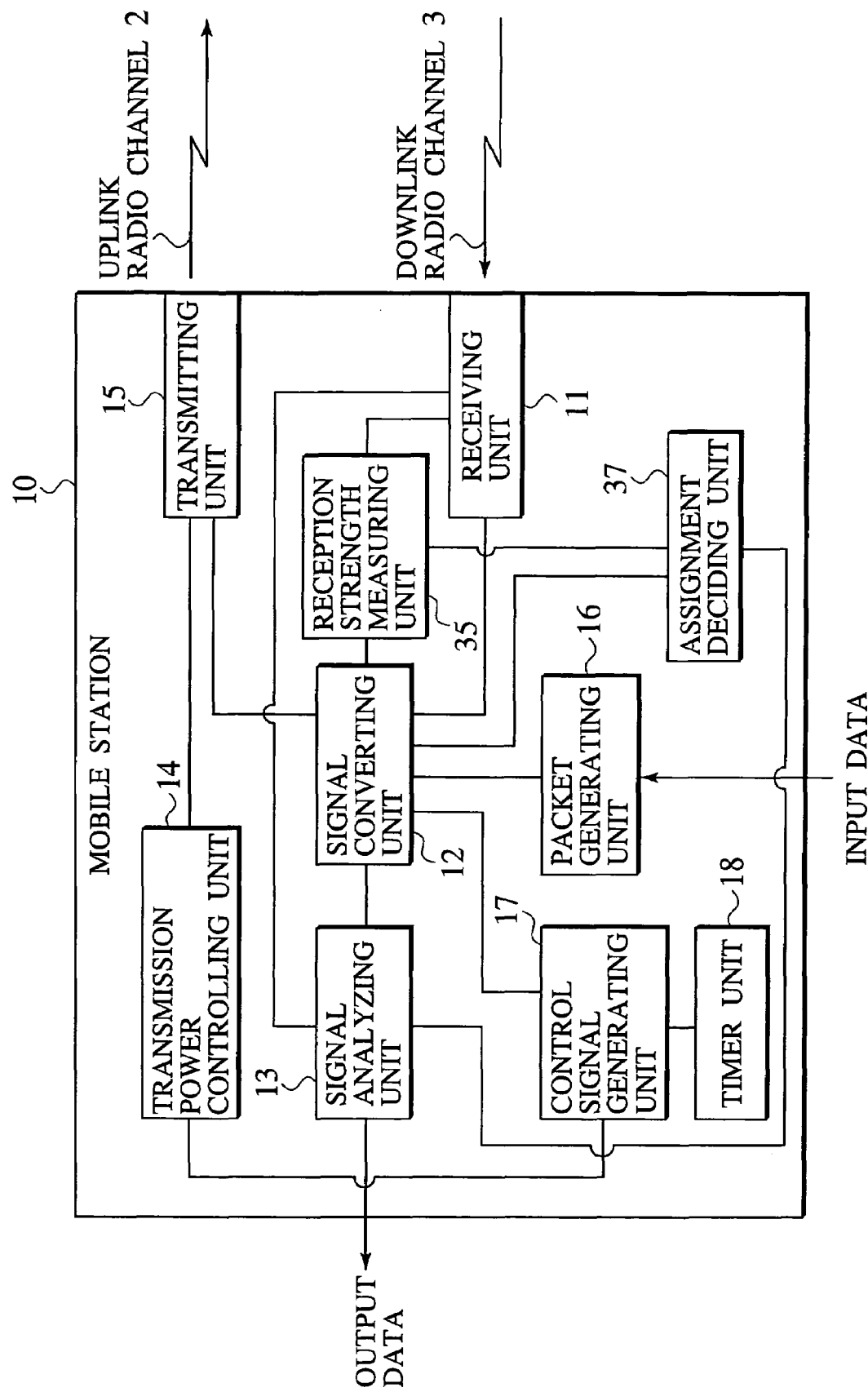
FIG. 7 is a functional block diagram of a mobile station in a radio packet communication system according to a second embodiment of the present invention.
Figure 8:
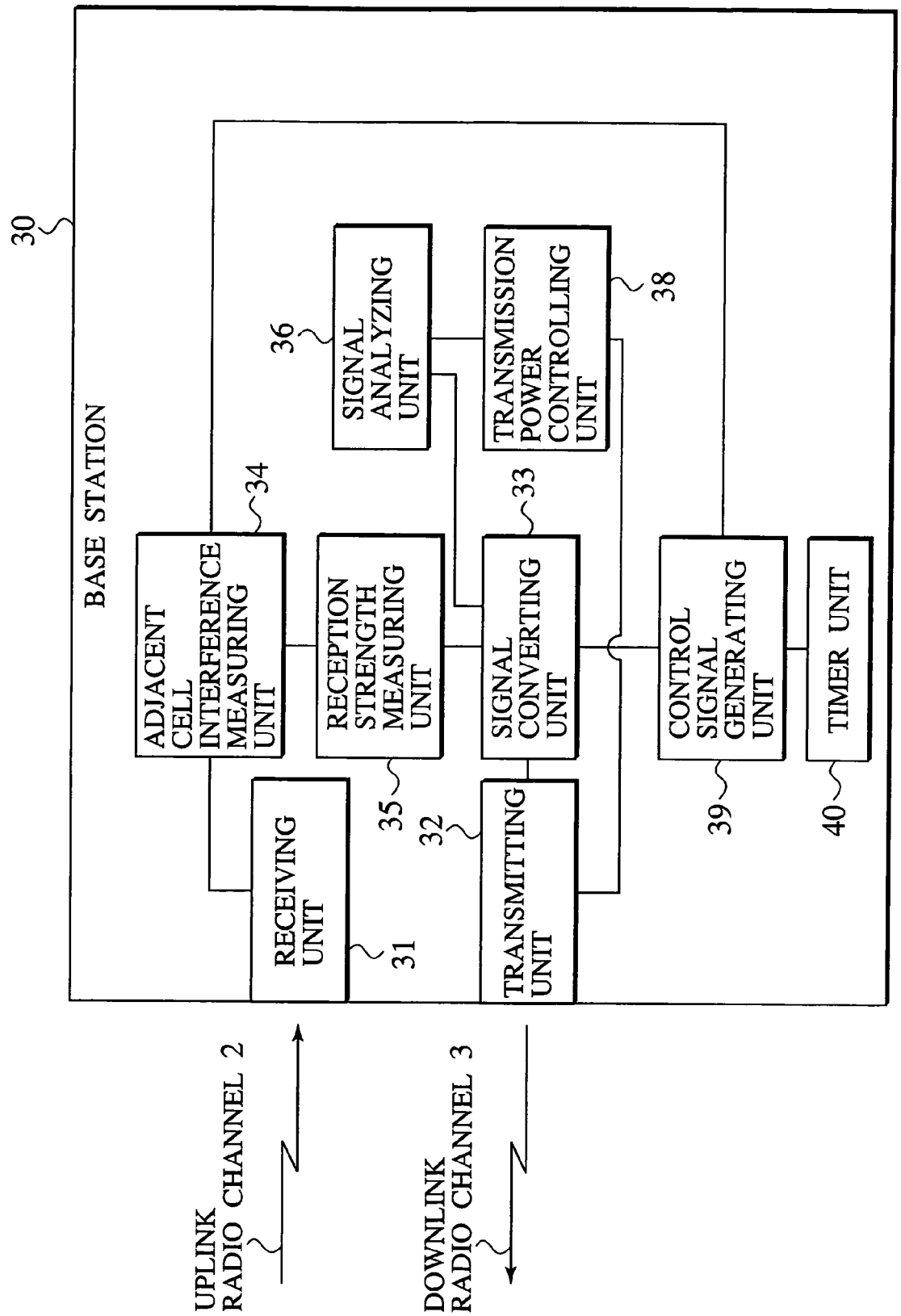
FIG. 8 is a functional block diagram of a base station in the radio packet communication system according to the second embodiment of the present invention.

As shown in FIG. 7 and FIG. 8, the configuration of the radio packet communication system according to this embodiment is the same as the configuration of the radio packet communication system according to the above-described first embodiment, except that the reception strength measuring unit 35 and the assignment deciding unit 37 is provided to the mobile station 10 instead of the base station 30.

Here, the reception strength measuring unit 35 constitutes the propagation loss calculator configured to calculate a propagation loss in the radio packet communication with the base station 30.

For example, the reception strength measuring unit 35 can calculate the above-described propagation loss by use of reception power of a pilot signal from the base station 30.

The assignment deciding unit 37 includes the plurality of radio resources assignment tables configured to associate the propagation loss in the radio packet communication, between the base station 30 and the mobile station 10, with the radio resources (see FIGS. 4A to 4C).

Meanwhile, the assignment deciding unit 37 constitutes the selector configured to select the specific radio resources assignment table in response to the interference amount caused by the adjacent cell which is notified by the base station 30.

The assignment deciding unit 37 constitutes the radio resources assigner configured to make reference to the selected radio resources assignment table and thereby to assign the radio resources associated with the calculated propagation loss, to the radio packet communication with the base station 30.

Meanwhile, the control signal generating unit 39 of the base station 30 generates control information including the interference amount caused by the adjacent cell B which is calculated by the adjacent cell interference measuring unit 34, and then transmits the control information to the mobile station 10 through the signal converting unit 33 and the transmitting unit 32.

(Actions of the Radio Packet Communication System According to this Embodiment)

Actions of the radio packet communication according to this embodiment will be described with reference to FIG. 9.

Figure 9:
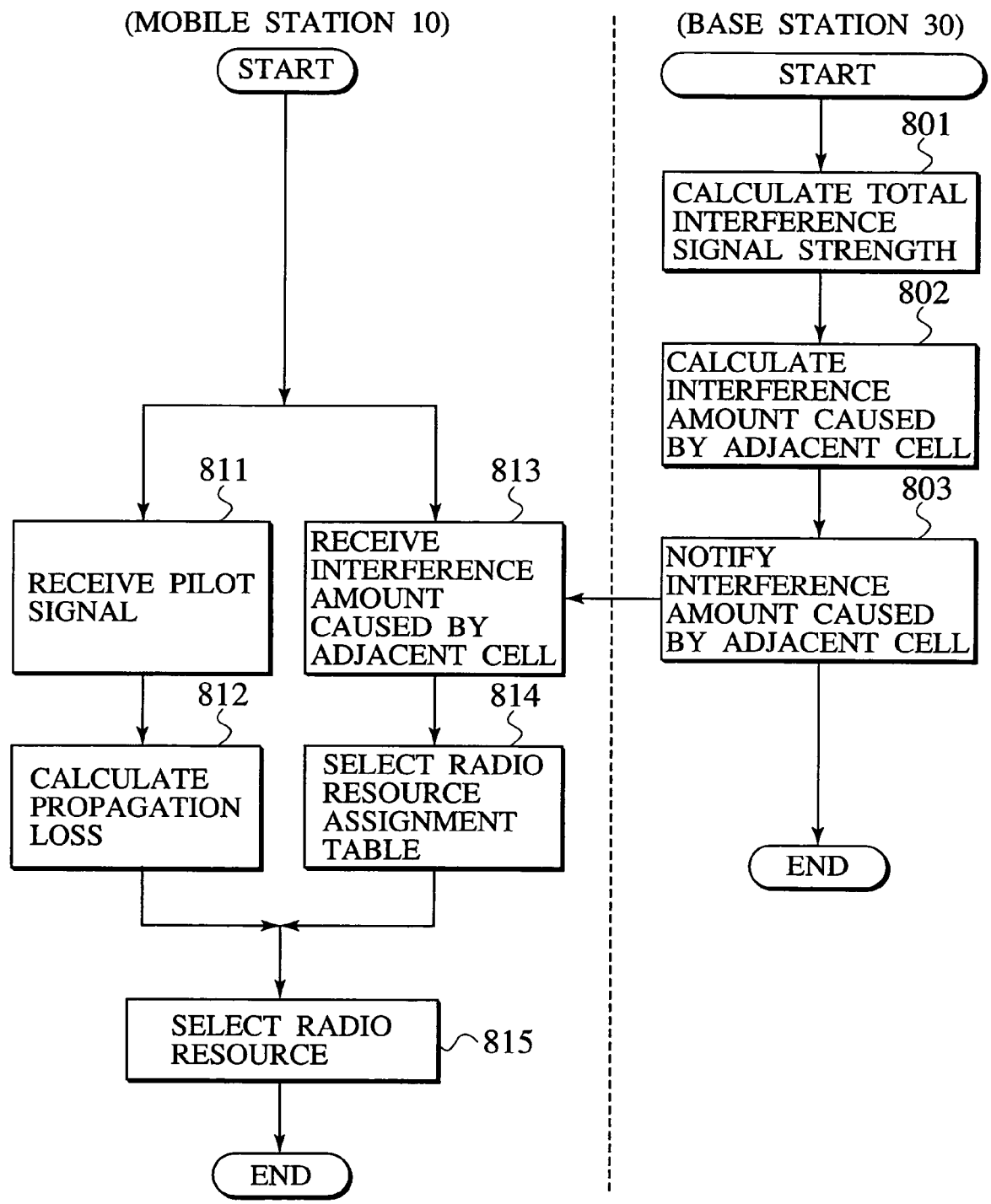
FIG. 9 is a flowchart showing an operation to allocate radio resources by the base station in the radio packet communication system according to the second embodiment of the present invention.

As shown in FIG. 9, in Step 801, the adjacent cell interference measuring unit 34 of the base station 30 calculates the total interference amount (the total interference signal strength) based on the signal transmitted from the mobile station 10.

In Step 802, the adjacent cell interference measuring unit 34 calculates the interference amount caused by the adjacent cell B, based on the calculated total interference amount (the total interference signal strength) and the interference amount in the original cell A calculated by the received amount of packets.

In Step 803, the control signal generating unit 39 of the base station 30 generates the control information including the interference amount caused by the adjacent cell B which is calculated by the adjacent cell interference measuring unit 34, and then transmits the control information to the mobile station 10 through the signal converting unit 33 and the transmitting unit 32.

The reception strength measuring unit 35 of the mobile station 10 receives the pilot signal from the base station 30 in Step 811, and calculates the above-described propagation loss by use of the reception power of the received pilot signal in Step 812.

In Step 813, the assignment deciding unit 37 of the mobile station 10 extracts the interference amount caused by the adjacent cell B included in the control information from the base station 30.

In Step 814, the assignment deciding unit 37 makes reference to the selection table shown in FIG. 4D, and selects the specific radio resources assignment table in response to the extracted interference amount caused by the adjacent cell B.

Here, the radio resources assignment table is updated in response to the interference amount caused by the adjacent cell B within a given period (such as several tens of seconds or several minutes).

Meanwhile, the interference amount caused by the adjacent cell B within the given period is calculated by adding the interference amount caused by the adjacent cell B in each time slot.

In Step 815, the assignment deciding unit 37 makes reference to the selected radio resources assignment table, and assigns the radio resources associated with the propagation loss calculated by the adjacent cell interference measuring unit 34, to the radio packet communication with the base station 30.

(Operation and Effect of the Radio Packet Communication System According to this Embodiment)

According to the radio packet communication system of this embodiment, the assignment deciding unit 37 of the mobile station 10 assigns the radio resources in response to the interference amount caused by the adjacent cell B which is transmitted from the base station 30. Therefore, it is possible to adjust the radio resources to be assigned to the mobile station 10 having the large interference amount with the adjacent cell (such as the mobile station located in the vicinity of the cell border) and the radio resources to be assigned to the mobile station 10 having the small interference amount with the adjacent cell (such as the mobile station located in the central part of the cell). In this way, it is possible to reduce the influence of the variation in the interference amount relative to the adjacent cell B without reducing the transmission rate of the mobile station located in the central part of the cell.

As described above, according to the present invention, it is possible to provide the radio packet communication system and the radio packet communication method which effectuates stable radio packet communication by moderating the influence of the variation in the interference amount with the adjacent cell B, and the base station and the mobile station which are suitable for use in the foregoing system and method.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A radio packet communication system for performing radio packet communication between a base station and a mobile station, wherein:
   the base station comprises:
   an adjacent cell interference amount calculator configured to calculate an adjacent cell interference amount caused by an adjacent cell which is adjacent to an original cell managed by the base station; and
   an adjacent cell interference amount notifier configured to notify the mobile station of the adjacent cell interference amount; and
   the mobile station comprises:
   a plurality of radio resource associators configured to associate a radio resource with a propagation loss in the radio packet communication;
   a selector configured to select a radio resource associator in accordance with the adjacent cell interference amount notified by the base station;
   a propagation loss calculator configured to calculate a propagation loss in the radio packet communication; and
   a radio resource assigner configured to assign the radio resource associated with the calculated propagation loss to the radio packet communication, in accordance with the selected radio resource associator.

2. A radio packet communication method for performing radio packet communication between a base station and a mobile station, the mobile station having a plurality of radio resource associators configured to associate a radio resource with a propagation loss in the radio packet communication, the method comprising the steps of:
   calculating, in the base station, an adjacent interference amount caused by an adjacent cell which is adjacent to an original cell managed by the base station;
   notifying, in the base station, the mobile station of the adjacent cell interference amount;
   selecting, in the mobile station, a radio resource associator in accordance with the adjacent cell interference amount notified by the base station;
   calculating, in the mobile station, a propagation loss in the radio packet communication; and
   assigning, in the mobile station, the radio resource associated with the calculated propagation loss to the radio packet communication, in accordance with the selected radio resource associator.

3. A base station for performing radio packet communication with a mobile station, the base station comprising:
   a plurality of radio resource associators configured to associate a radio resource with a propagation loss in the radio packet communication;
   an adjacent cell interference amount calculator configured to calculate an adjacent cell interference amount caused by an adjacent cell which is adjacent to an original cell managed by the base station;
   a selector configured to select a radio resource associator in accordance with the adjacent cell interference amount;
   a propagation loss calculator configured to calculate a propagation loss in the radio packet communication; and
   a radio resource assigner configured to assign the radio resource associated with the calculated propagation loss to the radio packet communication, in accordance with the selected radio resource associator.

4. The base station according to claim 3, further comprising an adjacent cell interference amount notifier configured to notify the mobile station of the adjacent cell interference amount.

5. The base station according to claim 3, wherein the adjacent cell interference amount calculator calculates a total interference amount based on a signal transmitted from the mobile station, calculate an original cell interference amount in the original cell base on a received packet amount, and calculate the adjacent cell interference amount base on the total interference amount and the original cell interference amount.

6. The base station according to claim 3, wherein the radio resource associator is updated in accordance with the adjacent cell interference amount calculated during a predetermined period.

7. A mobile station for performing radio packet communication with a base station, the mobile station comprising:
   a plurality of radio resource associators configured to associate a radio resource with a propagation loss in the radio packet communication;
   a selector configured to select a radio resource associator in accordance with an adjacent cell interference amount notified by the base station, the adjacent cell interference amount being caused by an adjacent cell which is adjacent to an original cell managed by the base station;
   a propagation loss calculator configured to calculate a propagation loss in the radio packet communication;
   a radio resource assigner configured to assign the radio resource associated with the calculated propagation loss to the radio packet communication, in accordance with the selected radio resource associator.

* * * * *